United States Patent
Endoh et al.

(10) Patent No.: US 6,487,164 B1
(45) Date of Patent: Nov. 26, 2002

(54) OPTICAL RECORDING MEDIUM CAPABLE OF ASSURING SUFFICIENT LEVELS OF SIGNALS REQUIRED FOR READING/WRITING DATA, AND STAMPER FOR MANUFACTURE OF THE SAME

(75) Inventors: Sohmei Endoh; Manabu Iwai; Katsuhiko Ohtomo; Tomiji Tanaka; Hiroshi Nakayama, all of Miyagi; Masayoshi Kanno, Tokyo; Masataka Shinoda, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 09/585,305

(22) Filed: Jun. 1, 2000

(30) Foreign Application Priority Data

Jun. 11, 1999 (JP) .................................... 11-165816

(51) Int. Cl.$^7$ ................................ G11B 7/24

(52) U.S. Cl. ................ 369/275.4; 369/275.3

(58) Field of Search ................ 369/275.4, 275.3

(56) References Cited

U.S. PATENT DOCUMENTS

| | | | | |
|---|---|---|---|---|
| 5,204,852 A | * | 4/1993 | Nakagawa et al. | 369/275.1 |
| 5,414,652 A | * | 5/1995 | Mieda et al. | 369/13 X |
| 5,696,742 A | * | 12/1997 | Ogata et al. | 369/32 |
| 5,970,027 A | * | 10/1999 | Nariat et al. | 369/13 |
| 6,115,352 A | * | 9/2000 | Ohno et al. | 369/275.4 |
| 6,128,273 A | * | 10/2000 | Horie et al. | 369/275.4 |
| 6,207,247 B1 | * | 3/2001 | Morita | 369/275.1 X |
| 6,243,352 B1 | * | 6/2001 | Kanno et al. | 369/275.1 |
| 6,254,966 B1 | * | 7/2001 | Kondo | 369/284 X |
| 6,284,084 B1 | * | 9/2001 | Takakumwa et al. | 156/245 |
| 6,292,458 B1 | * | 9/2001 | Eguchi et al. | 369/275.3 |
| 6,335,916 B1 | * | 1/2002 | Endo et al. | 369/275.4 |

FOREIGN PATENT DOCUMENTS

EP 0813193 A1 * 12/1997

OTHER PUBLICATIONS

USPub., US2001/0012265A1–Nishiyama et al.*
U.S. patent application Ser. No. 09/431,604, filed Nov. 1, 1999, pending.
U.S. patent application Ser. No. 09/354,239, filed Jul. 16, 1999, allowed.
U.S. patent application Ser. No. 09/585,305, filed Jun. 1, 2000, pending.
U.S. patent application Ser. No. 09/849,278, filed May 7, 2001, pending.
U.S. patent application Ser. No. 09/922,731, filed Aug. 7, 2001, pending.

* cited by examiner

Primary Examiner—Aristotelis M. Psitos
(74) Attorney, Agent, or Firm—Oblon, Spivak, McClelland, Maier & Neustadt, P.C.

(57) ABSTRACT

In an optical recording medium having a writable area in which grooves are formed along recording tracks and a read-only area in which pits are formed along the recording tracks, sufficient levels of signals required for data write and read can be assured even with the track pitch reduced for a higher recording density. Assuming that the refractive index of a medium provided extending from a light-incident surface to a surface in which the grooves and pits are formed is n and the wavelength of a light used for data write and read is $\lambda$, the grooves and pits has a width within a range of $\lambda/7.5$ n to $\lambda/6$. On the assumption that the width of each of the grooves formed in the writable area is Wg and the pitch between the recording tracks in the writable area is Tp1, Wg/Tp1 is within a range of 18.4% to 31.1%. When it is assumed that the width of each of the pitches formed in the read-only area is Wp and the pitch between the recording tracks in the read-only area is Tp2, Wp/Tp2 is within a range of 35.7% to 44.3%.

2 Claims, 8 Drawing Sheets

| | | | |
|---|---|---|---|
| $W_G$ (width) | : (.184 - .311) TP1 | W (width) | : (.357 - .443) TP |
| $D_G$ (depth) | : $\lambda/6.0n - \lambda/7.5n$ | $D_G$ (depth) | : $\lambda/6.0n - \lambda/7.5n$ |
| TP (trackpitch) | : TP1 | TP (trackpitch) | : TP2 |
| A (wobble amplitude) | : (.0168 - .0253) TP1 | | |

FIGURE 8

| W$_G$ (width)       :  (.184 - .311) TP1      | W (width)       :  (.357 - .443) TP |
|---|---|
| D$_G$ (depth)       :  $\lambda/6.0n - \lambda/7.5n$ | D$_G$ (depth)   :  $\lambda/6.0n - \lambda/7.5n$ |
| TP (trackpitch) :  TP1                        | TP (trackpitch) :  TP2              |
| A (wobble amplitude) :  (.0168 - .0253) TP1   |                                     |

OPTICAL RECORDING MEDIUM CAPABLE OF ASSURING SUFFICIENT LEVELS OF SIGNALS REQUIRED FOR READING/WRITING DATA, AND STAMPER FOR MANUFACTURE OF THE SAME

BACKGROUND OF THE INVENTION

1. Field of the Invention

The present invention relates to an optical recording medium having a writable area in which grooves are formed along recording tracks and a read-only area in which pits are formed along the recording tracks, and a stamper destined for use to manufacture the optical recording medium.

2. Description of the Related Art

The optical recording media include an optical disc, magneto-optical disc, phase-change type optical disc, etc. In some of such optical recording media, there are provided a writable area having formed therein along recording tracks grooves at which information signal can be written, and a read-only area in which pits corresponding to information signal are pre-formed along the recording tracks. A typical one of the optical recording media that has both the writable and read-only areas is currently available under the name of "Mini Disc (MD)".

The MD is a magneto-optical disc of a recording format shown in FIG. 1. As will be seen from FIG. 1, the MD has a writable area 101 having formed therein single-spirally along recording tracks grooves g at which information signal can be written, and a read-only area 102 in which pits p corresponding to information signal are pre-formed single-spirally along the recording tracks.

In the writable area 101, there can be written information signal at the grooves g by magneto-optical recording. On the other hand, in the read-only area 102, there are pre-recorded information such as TOC (Table Of Contents), etc. by pits p. Note that it is prescribed for the MD that both track pitch T1 in the writable area 101 and track pitch T2 in the read-only area 102 should be 1.6 $\mu$m.

As a next-generation magneto-optical disc, "MD Data2" has been proposed which is about 4 times higher in recording density than the conventional MDs and has a storage capacity of about 650 MB.

The recording format in the MD Data2 is as shown in FIG. 2. The MD Data2 has also a writable area 111 having formed therein along recording tracks two types of grooves gw and gs at which information signal can be written, and a read-only area 112 in which pits p corresponding to information signal are pre-formed along the recording tracks, as shown in FIG. 2.

In the MD Data2, the writable area 111 has formed therein double-spirally two types of grooves gw and gs. One (gw) of these grooves gw and gs is a groove wobbled correspondingly to address information while the other (gs) is a straight groove, not wobbled. Information signal is recorded on a land between the wobbling and straight grooves gw and gs.

In the writable area 111 of the MD Data2, the interval between the neighboring wobbling groove gw and straight groove gs is taken as a track pitch. Track pitch T3 in the writable area is 0.95 $\mu$m. In the MD Data2, the interval between the neighboring straight grooves gs is called a track period. Track period T4 is two times larger than the track pitch T3 and it is thus 1.90 $\mu$m.

On the other hand, in the read-only area 112 of the MD Data2, the pits p are formed single-spirally along the recording tracks as in the MD. The pits p record TOC information or the like. In the MD Data2, however, track pitch T5 in the read-only area 112 is 0.95 $\mu$m similarly to the track pitch T3 in the writable area 111.

As mentioned above, in the MD Data2, the track pitch is defined considerably smaller than that in the MD in order to improve the recording density. However, the reduced track pitch will lead to a lower level of a written or read signal.

For example, a push-pull signal is used in the tracking servo control to allow a light spot to track a recording track during data write or read. When the track pitch is reduced, a resulted push-pull signal will have a lower level. Especially, a push-pull signal obtainable from the read-only area in which only pits are formed has originally a low level. When the track pitch is reduced as in the MD Data2, it is essential to assure a sufficient level of a push-pull signal from the read-only area as well.

Also, in case the track pitch is made smaller, the modulation degree and readout characteristics (jitter, etc.) of the pits will be worse when signals are read from the pits in the read-only area. Similarly, in case the track pitch is made smaller, the writing and readout characteristics (jitter, etc.) will be worse when signals are written to or read from the grooves in the writable area.

Therefore, for a higher recording density as in the MD Data2, not only the track pitch should be reduced but also it is necessary to assure sufficient modulation degree and readout characteristics of the pits formed in the read-only area when signals are read from the pits, and sufficient writing and readout characteristics when signals are written to or read from the writable area.

When address information is added to the wobbling grooves as in the MD Data2, it is desired that the address information can successfully be read from the wobbling grooves. That is, it is necessary to assure a sufficient C/N with which the wobbling of the wobbling grooves is detected.

As in the foregoing, for a higher recording density of an optical recording medium, not only the track pitch should be reduced but also sufficient levels of various signals required for data write and read should be assured for various characteristics.

OBJECT AND SUMMARY OF THE INVENTION

It is therefore an object of the present invention to overcome the above-mentioned drawbacks of the prior art by providing an optical recording medium capable of assuring sufficient levels of signals required for data write and read, even with the track pitch reduced for a higher recording density as in the MD Data2.

It is another object of the present invention to provide a stamper destined for use in manufacturing such an optical recording medium.

The above object can be attained by providing an optical recording medium having a writable area in which grooves are formed along recording tracks and a read-only area in which pits are formed along the recording tracks, wherein:

on the assumption that the refractive index of a medium provided extending from a light-incident surface to a surface in which the grooves and pits are formed is n and the wavelength of a light used for data write and read is $\lambda$, the grooves and pits has a width within a range of $\lambda/7.5$ n to $\lambda/6.0$ n;

on the assumption that the width of each of the grooves formed in the writable area is Wg and the pitch between the recording tracks in the writable area is Tp1, Wg/Tp1 is within a range of 18.4 to 31.1%; and on the assumption that the width of each of the pitches formed in the read-only area is Wp and the pitch between the recording tracks in the read-only area is Tp2, Wp/Tp2 is within a range of 35.7 to 44.3%.

By defining the depth and width of the grooves and pits as in the above, it is possible to assure sufficient levels of signals required for data write and read, even with the track pitch reduced for a higher recording density.

The above optical recording medium may be adapted such that the writable area has two grooves formed double-spirally therein, and at least one of these grooves is at least partially wobbled. In this case, assuming that the amplitude of the wobbling groove is A, A/Tp1 should preferably be within a range of ±1.68 to ±2.53%. By thus defining the amplitude of the wobbling grooves, it is possible to assure a sufficient C/N with which the wobbling of the wobbling grooves is detected, even with the track pitch being reduced.

Also the above object can be attained by providing a stamper for use to manufacture the above optical recording medium and having formed thereon pit and land patterns corresponding to at least the grooves to be formed in the writable area of the optical recording medium and the pits to be formed in the read-only area of the optical recording medium.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 8 summarizes the preferred variable ranges in the read and write portions of an optical recording medium and a stamper for use to manufacture an optical recording medium in accordance with the present invention.

DETAILED DESCRIPTION OF THE PREFERRED EMBODIMENTS

In the following, the present invention will be described concerning a magneto-optical disc. However, the present invention is also applicable to many other types of optical recording media than the magneto-optical disc which will be described herebelow, each having a writable area in which there are formed along recording tracks grooves at which information signal can be written, and a read-only area in which pits corresponding to information signal are formed along the recording tracks.

Magneto-optical Disc

Figure 1:
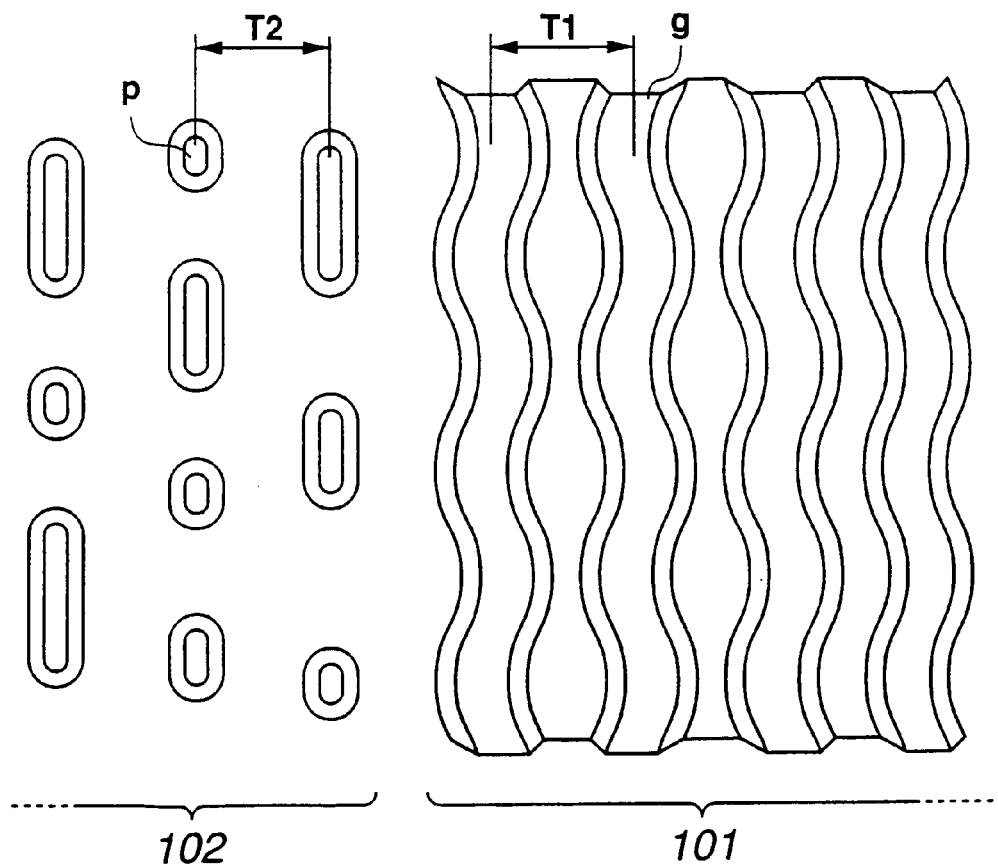
FIG. 1 is a view, enlarged in scale, of a part of the information recording area of a conventional MD, showing the recording format of the MD.
Figure 2:
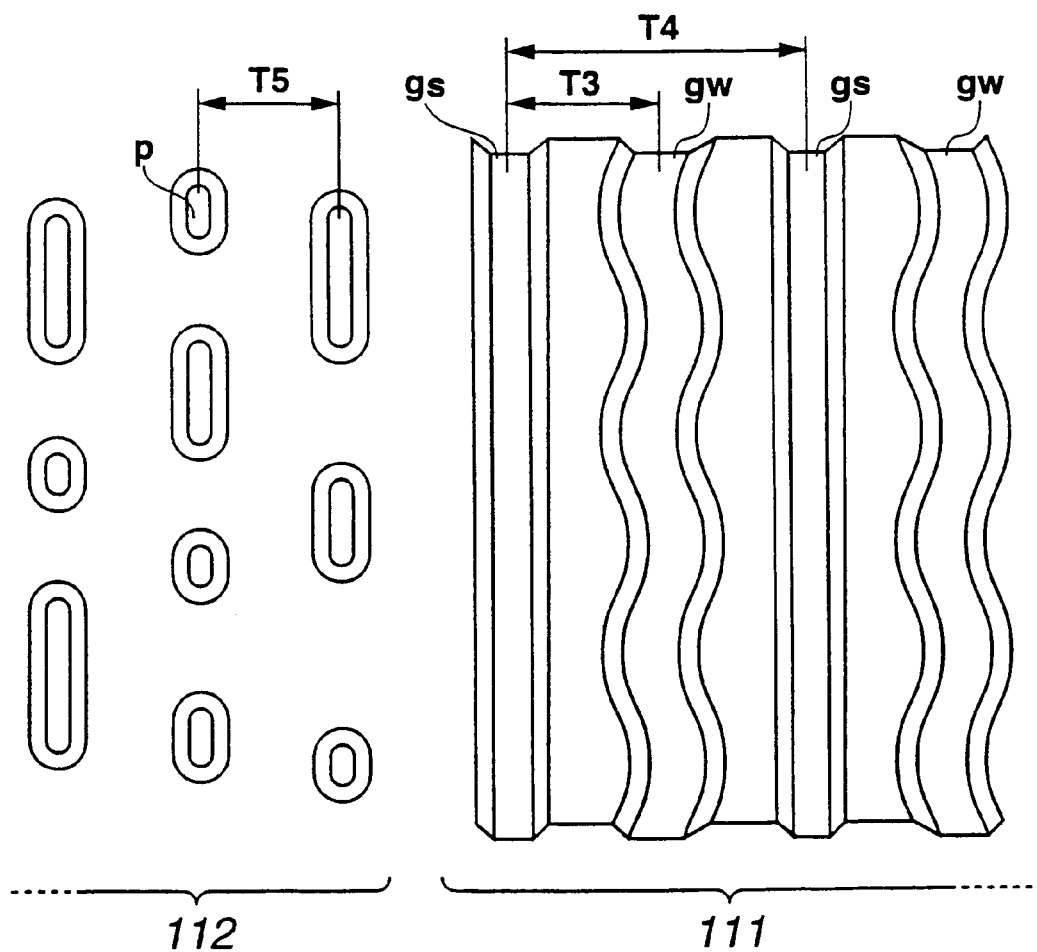
FIG. 2 is a view, enlarged in scale, of a part of the information recording area of the MD Data2, showing the recording format of the MD Data2.
Figure 3:
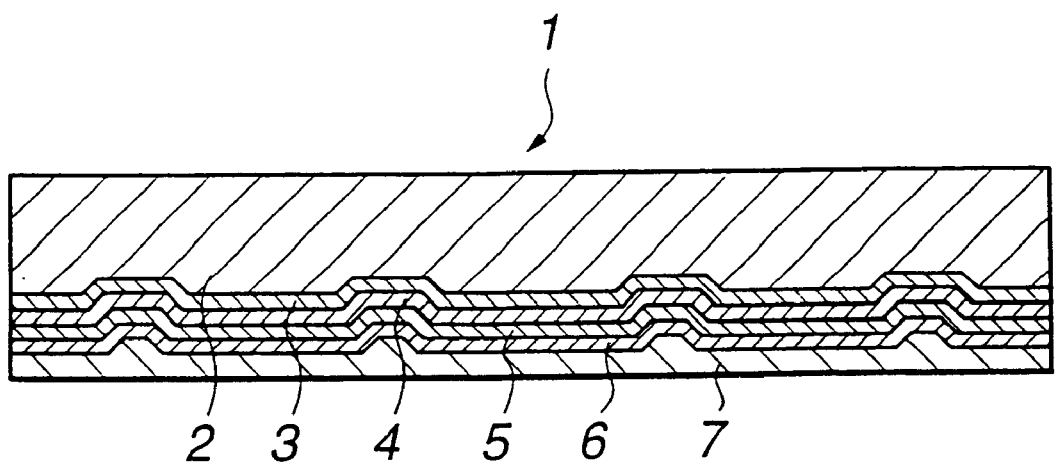
FIG. 3 is a sectional view, enlarged in scale, of an essential part of a magneto-optical disc as the optical recording medium according to the present invention, showing the construction of the disc.

First a magneto-optical disc will be described as a non-limitative example of the optical recording medium according to the present invention. The magneto-optical disc is generally indicated with a reference 1. As shown in FIG. 3, the magneto-optical disc 1 is comprised of a disc-shaped substrate 2, a first dielectric layer 3, a photomagnetic layer 4, a second dielectric layer 5 and a light-reflective layer 6, laminated one on the other in this order. Further, a protective layer 7 made of an ultraviolet-setting resin or the like is formed on the light-reflective layer 6.

The disc substrate 2 is formed from polycarbonate (PC), polymethyl methacrylate (PMMA) or the like, and has grooves and pits formed therein. The first and second dielectric layers 3 and 5 are formed from $SiO_2$, $Si_3N_4$, $Al_2O_3$ or the like. The photomagnetic layer 4 is formed from TbFeCo, GdFeCo or the like and will have information signal magneto-optically written thereto. That is, in this magneto-optical disc 1, information signal is magneto-optically written to the photomagnetic layer 4. Note that the photomagnetic layer 4 may be of either a single-layer structure or a multi-layer structure. The light-reflective layer 6 is formed from Al or the like. It reflects incident light during data write or read. It also acts as a thermal diffusive layer to diffuse a heat developed by the irradiated light.

Figure 4:
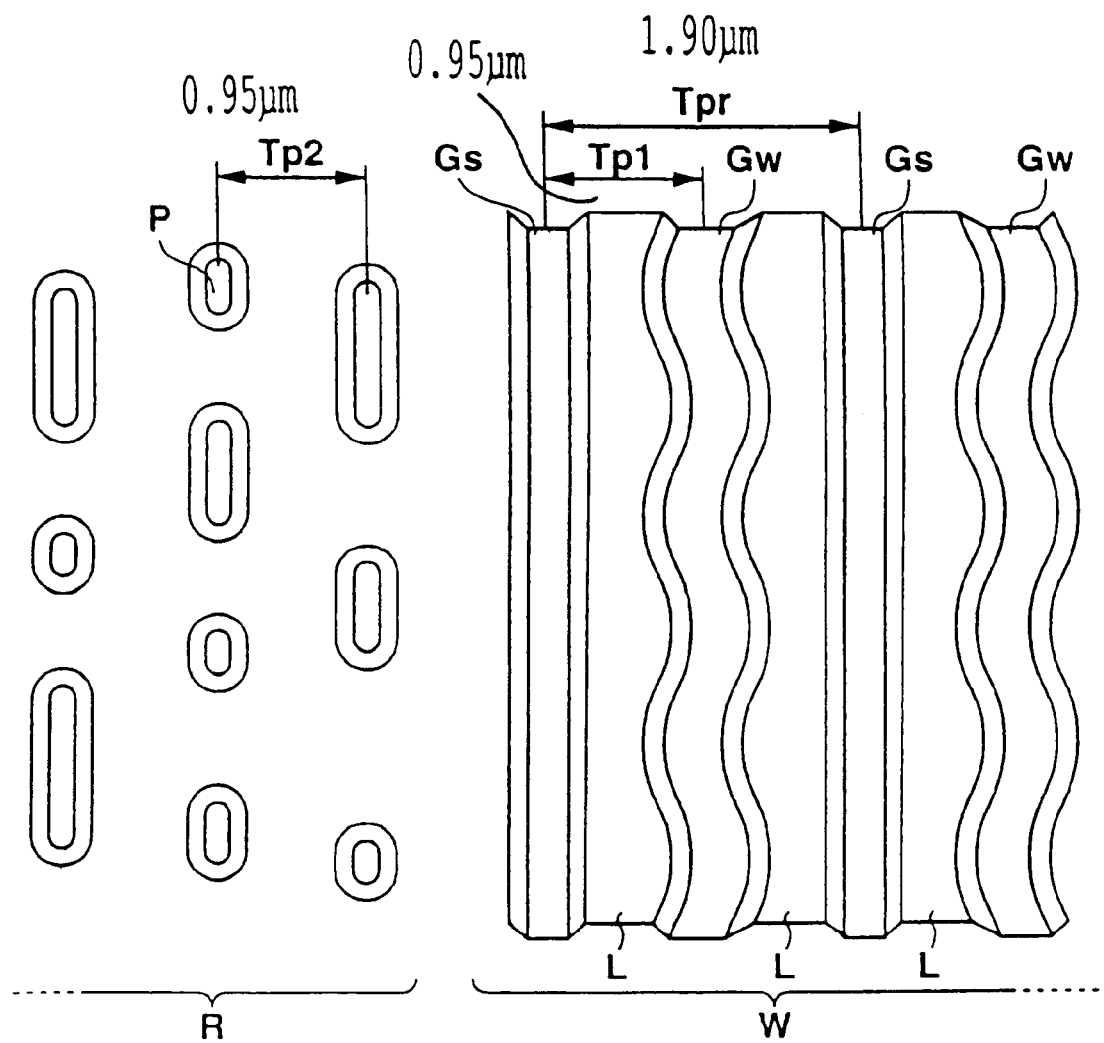
FIG. 4 is a view, enlarged in scale, of a part of the information recording area of the magneto-optical disc in FIG. 3, showing the recording format of the disc.

FIG. 4 is a view, enlarged in scale, of a part of an information recording area of the magneto-optical disc 1. Note that only the grooves and pits are shown in FIG. 4 for a better understanding of the format of grooves and pits formed in the information recording area and the structure of the layers laminated one on the other on the disc substrate 2 are not shown in FIG. 4.

As shown in FIG. 4, the magneto-optical disc 1 has a writable area W in which information signal can be written, and a read-only area R in which pits P corresponding to information signal are pre-formed along recording tracks.

In the writable area W, information signal is rewritable repeatedly by magneto-optical recording. The writable area W has wobbling grooves Gw and straight grooves Gs formed double-spirally along the recording tracks. Information signal is written on a land L between the grooves Gw and Gs.

In the writable area W, the interval between the wobbling groove Gw and straight groove Gs, adjacent to each other, that is, track pitch Tp1, is 0.95 µm for example. The interval between the two successive straight grooves Gs, that is, track period Tpr, is double the track pitch Tp1, namely 1.90 µm for example.

Further in the writable area W, the grooves Gw and Gs are formed to have a width Wg so that Wg/Tp1 is within a range of 18.4 to 31.1%. Therefore, when the track pitch Tp1 is 0.95 µm, the grooves Gw and Gs will have a width Wg of 175 to 295 nm.

In addition, the depth of the grooves Gw and Gs formed in the writable area W is within a range of $\lambda/7.5\,n$ to $\lambda/6.0\,n$ where n is the refractive index of a medium provided extending from the light-incident surface of the magneto-optical disc 1 to the surface in which the grooves Gw and Gs are formed, that is, the refractive index of the disc substrate 2 and λ is the wavelength of a light used for data write and read to and from the magneto-optical disc 1. Therefore, when the refractive index of the disc substrate 2 is n=1.58 and the wavelength of the light used for data write and read to and from the magneto-optical disc 1 is λ=660 nm, the depth of the grooves Gw and Gw formed in the writable area W will be within a range of 56 to 70 nm.

As mentioned above, the two types of grooves Gw and Gs are formed double-spirally in the writable area W. At least one of these types of grooves is a wobbling groove Gw which is at least partially wobbled correspondingly to address information. Namely, the wobbling groove Gw has address information added thereto by the wobbling. Address information added to the groove itself will be referred to as "wobbling address information" hereafter.

When the recording tracks in the writable area W are formed with the pitch Tp1, the wobbling grooves Gw are wobbled with an amplitude A so that A/Tp1 is within a range of ±1.68 to ±2.53%. Therefore, when the track pitch Tp1 is 0.95 μm for example as in the above, the wobbling amplitude A of the wobbling grooves Gw is within a range of ±16 to ±24 nm.

On the other hand, the read-only area R has formed therein pits P corresponding to information signal along the recording tracks. No new information signal will be written to this read-only area R but only information signal pre-recorded as a train of many pits P can be read from the read-only area R.

In the read-only area R, the interval between neighboring pit trains, that is, track pitch Tp2, is 0.95 μm for example. The pits P are formed in the read-only area R to have a width Wp and a pitch Tp2 between the recording tracks so that Wp/Tp2 is within a range of 35.7 to 44.3%. Therefore, when the track pitch Tp2 is 0.95 μm, the pits P have a width of 339 to 421 nm.

In the read-only area R, the pits P are formed to have a depth of λ/7.5 to λ/6.0 n similarly to the grooves Gw and Gs in the writable area W. Therefore, when the refractive index of the disc substrate 2 is n=1.58 and the wavelength of the laser light used for data write and read to and from the magneto-optical disc 1 is λ=660 nm, the depth of the pits P in the read-only area R is within a range of 56 to 70 nm.

Even with the track pitches Tp1 and Tp2 reduced to 0.95 μm for example in the above magneto-optical disc 1, the definition of the depth and width of the grooves Gw and Gs and pits P as in the above assures sufficient levels of various signals necessary for data write and read as will be apparent from the results of evaluation given later.

1. Manufacture of the Magneto-optical Disc

How to manufacture the magneto-optical disc 1 according to the present invention will be described in details below:

For manufacture of the magneto-optical disc 1, a magneto-optical disc manufacturing stamper is first prepared which has formed therein pit and land patterns corresponding to the grooves Gw and Gs and pits P which are to be formed in the magneto-optical disc 1. This is the stamper preparing process.

In the stamper preparing process, a disc-like glass substrate whose surfaces have been polished is washed and dried. Then, the glass substrate is coated on one side thereof with a photoresist which is a photosensitive resin. The photoresist is exposed to a laser light in a laser cutting apparatus which will further be described later, to form in the photoresist latent images corresponding to the grooves Gw and Gs and pits P which are to be formed in the magneto-optical disc 1.

After the latent images are formed in the photoresist, the glass substrate is mounted on a turntable of a developing machine with the photoresist-coated side thereof placed upside. While the glass substrate is being rotated with the turntable rotated, a developer is dripped onto the photoresist to develop the photoresist, thereby forming the pit and land patterns corresponding to the grooves Gw and Gs and pits P in the magneto-optical disc 1.

Next, an electroconductive layer of Ni or the like is formed on the pit and land patterns by the electroless plating. The glass substrate having the electroconductive layer thus formed thereon is mounted on an electroforming apparatus to form on the electroconductive layer a metal layer of Ni or the like to a thickness of about 300±5 μm by the electroplating. Thereafter, the metal layer is separated, and the metal layer thus separated is washed with acetone or the like to remove the photoresist remaining on the surface of the metal layer to which the pit and land patterns have been transferred.

With the above operations, there has been completed a magneto-optical disc manufacturing stamper formed from the metal layer to which the pit and land patterns formed on the glass substrate has been transferred. Note that this stamper is one of embodiments of the magneto-optical disc manufacturing stamper according to the present invention. The pit and land patterns formed on the stamper include a pit and land pattern corresponding to the grooves Gw and Gs which are to be formed in the writable area W of the magneto-optical disc 1, and a pit and land pattern corresponding to the pits P which are to be formed in the read-only area R of the magneto-optical disc 1.

Then, the photopolymer method (so-called 2P method) is used to prepare the disc substrate 2 having transferred thereto the surface shape of the above-mentioned stamper. More specifically, a photopolymer is applied uniformly to the stamper surface having the pit and land patterns formed therein to form a photopolymer layer, and then a base plate of a polycarbonate, polymethyl methacrylate or the like is closely attached to the photopolymer layer with care for no bubble or dust to be in the photopolymer layer. Thereafter, the photopolymer layer is hardened by irradiating ultraviolet to it. The photopolymer layer thus hardened is separated from the stamper. Thus the disc substrate 2 is completed which has the stamper surface shape transferred thereto.

In the above, an example has been described that the 2P method is used to prepare the disc substrate 2 for the purpose of accurately transferring the pit and land patterns of the stamper to the disc substrate 2. In a mass production of the dis substrate 2, however, injection molding of polymethyl methacrylate, polycarbonate or the like may be adopted.

Next, various layers are formed on the disc substrate 2. Namely, a first dielectric layer 3, photomagnetic layer 4, second dielectric layer 5, light-reflective layer 6 and a protective layer 7 are formed on the disc substrate 2 having the stamper surface shape transferred thereto.

More specifically, there are formed by the sputtering on the surface of the disc substrate 2 to which the pit and land patterns have been transferred the first dielectric layer 3 of $Si_3N_4$, $SiO_2$ or $Al_2O_3$, photomagnetic layer 4 of TbFeCo or GdFeCo, second dielectric layer 5 of $Si_3N_4$, $SiO_2$ or $Al_2O_3$, and the light-reflective layer 6 of Al, laminated one on the other in this order. Then, an ultraviolet-setting resin is applied to the light-reflective layer 5 by the spin-coat method, and exposed to ultraviolet. The resin thus hardened provides the protective layer 7.

With the above operations, the magneto-optical disc 1 is completed.

2. Laser Cutting Apparatus

Figure 5:
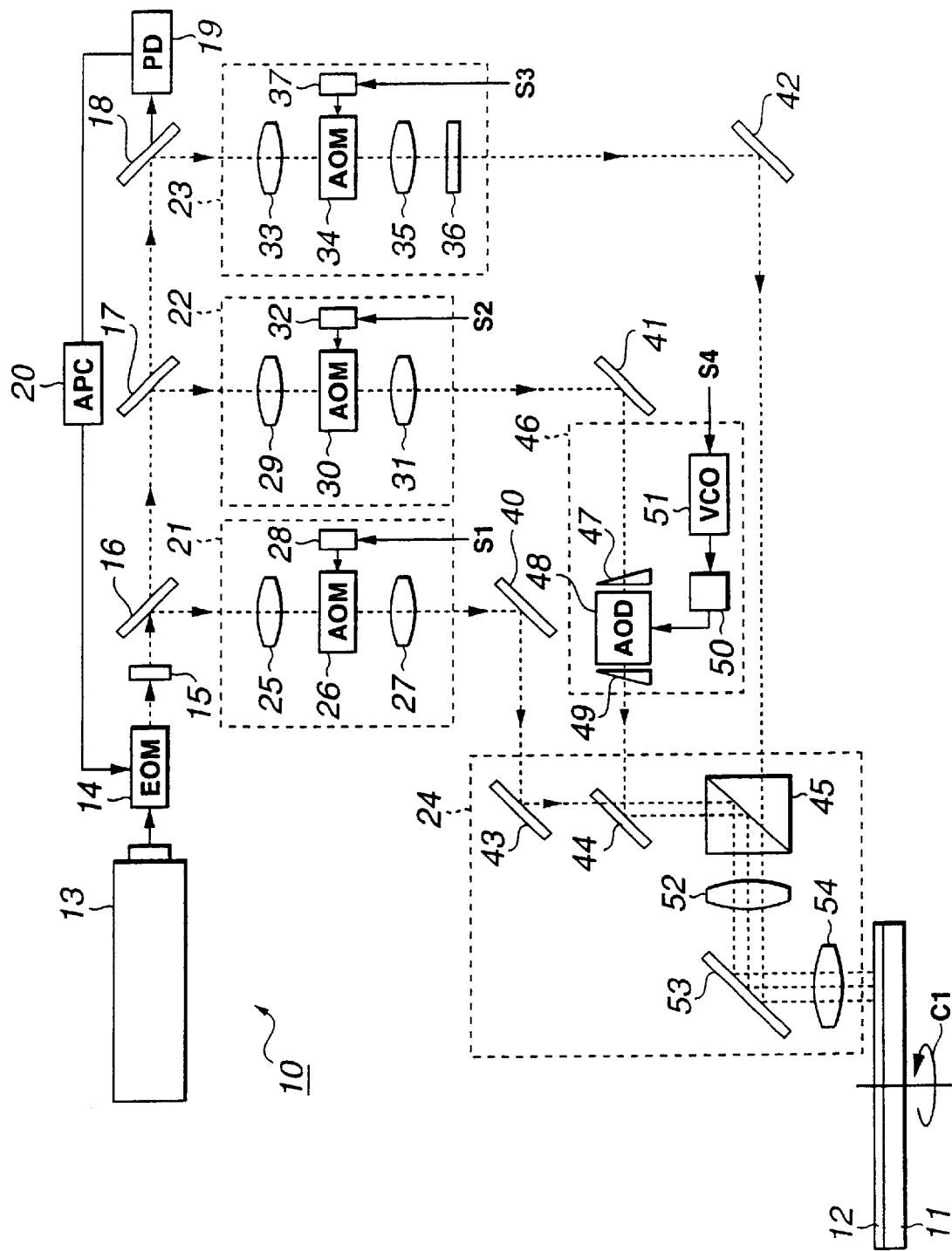
FIG. 5 shows an example of the laser cutting apparatus used in manufacturing the optical recording medium manufacturing stamper according to the present invention, showing the outline of the optical system of the apparatus.

Referring now to FIG. 5, there is shown the laser cutting apparatus used in preparing the stamper for the magneto-optical disc 1 as having been described in the foregoing. One example of the laser cutting apparatus will be described in detail below.

The laser cutting apparatus is generally indicated with a reference 10 in FIG. 5. Briefly, the laser cutting apparatus 10 is to expose the photoresist 12 coated on the glass substrate 11 to a laser light in order to form latent images in the photoresist 12. For formation of the latent images in the photoresist 12 by the laser cutting apparatus 10, the glass substrate 11 coated with the photoresist 12 is mounted on a rotation drive provided on a moving optical table. During exposure of the photoresist 12 to the laser beam, the glass substrate 11 is rotated by the rotation drive in the direction of arrow C1 while being translated by the moving optical table so that all the surfaces of the photoresist 12 will be exposed in a desired pattern to the laser light.

The laser cutting apparatus 10 is adapted such that the photoresist 12 is exposed to three laser beams which will form latent images corresponding to the grooves Gw and Gs and pits P which are to be formed in the magneto-optical disc 1.

The above laser cutting apparatus 10 includes a light source 13 to emit laser light, an electro-optical modulator (EOM) 14 to adjust the intensity of the laser light emitted from the light source 13, an analyzer 15 disposed on the optical axis of the laser light emitted from the EOM 14, a first beam splitter 16 to split the laser light having been transmitted through the analyzer 15 into a reflected light and transmitted light, a second beam splitter 17 to split the laser light having been transmitted through the first beam splitter 16 into a reflected light and transmitted light, a third beam splitter 18 to split the laser light having been transmitted through the second beam splitter 17 into a reflected light and transmitted light, a photodetector (PD) 19 to detect the laser light having been transmitted through the third beam splitter 18, and an automatic power controller (APC) 20 to apply a signal field to the EOM 14 in order to adjust the intensity of the laser light emitted from the EOM 14.

In the laser cutting apparatus 10, the laser light emitted from the light source 13 is adjusted by means of the EOM 14 driven with the signal field applied from the APC 20 to have a predetermined intensity, and then is incident upon the analyzer 15. The analyzer 15 is adapted to transmit only an S-polarized light. Namely, the laser light transmitted from the analyzer 15 becomes an S-polarized light.

The light source 13 may be any one selected among a variety of commercially available lasers but it should preferably be a one which is designed to emit a laser light having a relatively short wavelength. More particularly, the light source 13 should preferably be a Kr laser which emits a laser light having a wavelength $\lambda$ of 413 nm, a He-Cd laser which emits a laser light of 442 nm in wavelength $\lambda$, or the like.

The S-polarized laser light having been transmitted through the analyzer 15 is first split into a reflected light and transmitted light by the first beam splitter 16, the laser light having been transmitted through the first beam splitter 16 is also split into a reflected light and transmitted light by the second beam splitter 17, and the laser light having been transmitted through the second beam splitter 17 is further split into a reflected light and transmitted light by the third beam splitter 18.

In the laser cutting apparatus 10, the laser light reflected by the first beam splitter 16 is a first exposure beam for forming latent images corresponding to the pits P, and the laser light reflected by the second beam splitter 17 is a second exposure light for forming latent images corresponding to the grooves Gw. The laser light reflected by the third beam splitter 18 is a third exposure light for forming latent images corresponding to the grooves Gs.

On the other hand, the laser light having been transmitted from the third beam splitter 18 has the intensity thereof detected by the PD 19, and a signal corresponding to the detected light intensity is sent from the PD 19 to the APC 20. The APC 20 adjusts a signal field for application to the EOM 14 to a predetermined level depending upon the signal sent from the PD 19. Namely, the automatic power control is done for the laser light emitted from the EOM 14 to be constant, thereby providing a noiseless, stable laser light.

The laser cutting apparatus 10 further includes a first modulating optical system 21 to modulate the intensity of the laser light reflected by the first beam splitter 16, a second modulating optical system 22 to modulate the intensity of the laser light reflected by the second beam splitter 17, a third modulating optical system 23 to modulate the intensity of the laser light reflected by the third beam splitter 18, and an optical system 24 to recombine the laser beams having thus been modulated in intensity by the first to third modulating optical systems 21 to 23 and converge the combined laser light onto the photoresist 12.

The first exposure beam reflected by the first beam splitter 16 is guided to the first modulating optical system 21 in which it will be modulated in intensity. Similarly, the second exposure beam reflected by the second beam splitter 17 is guided to the second modulating optical system 22 in which it will be modulated in intensity. Also, the third exposure beam reflected by the third beam splitter 18 is guided to the third modulating optical system 23 in which it will be modulated in intensity.

The first exposure beam incident upon the first modulating optical system 21 is converged by a condenser lens 25 and incident upon an acousto-optical modulator (AOM) 26 which uses an acousto-optical element form from tellurium oxide ($TeO_2$) or the like to modulate the intensity of the first exposure correspondingly to a desired exposure pattern. That is, the first exposure beam is modulated in intensity by the AOM 26 correspondingly to a pattern of the pits P to be formed in the read-only area R. The first exposure beam having thus been modulated in intensity by the AOM 26 is shaped by a collimator lens 27 to be a parallel light which will go out of the first modulating optical system 21.

The AOM 26 is provided with a driver 28 to drive the AOM 26. For exposure of the photoresist 12 to the laser beam, a signal S1 corresponding to a desired exposure pattern, that is, a signal corresponding to the pattern of pits P to be formed in the read-only area R, is supplied to the driver 28 which will drive the AOM 26 according to the signal S1. Thus the AOM 26 will modulate the intensity of the first exposure beam.

The second exposure beam incident upon the second modulating optical system 22 is converged by a condenser lens 29 and incident upon an AOM 30 which uses an acousto-optical element formed from tellurium oxide ($TeO_2$) or the like to modulate the intensity of the second exposure beam correspondingly to a desired exposure pattern. That is, the second exposure beam is modulated in intensity by the AOM 30 correspondingly to a pattern of the wobbling grooves Gw to be formed in the writable area W. The second exposure beam having thus been modulated in intensity by the AOM 30 is shaped by a collimator lens 31 to be a parallel light which will go out of the second modulating optical system 22.

The AOM 30 is provided with a driver 32 to drive the AOM 30. For exposure of the photoresist 12 to the laser beam, a signal S2 corresponding to a desired exposure pattern, that is, a constant-level signal corresponding to the pattern of wobbling grooves Gw to be formed in the writable area W, is supplied to the driver 32 which will drive the AOM 30 according to the signal S2. Thus the AOM 30 will modulate the intensity of the second exposure beam.

The third exposure beam incident upon the third modulating optical system 23 is converged by a condenser lens 33 and incident upon an AOM 34 which uses an acousto-optical element formed from tellurium oxide (TeO$_2$) or the like to modulate the intensity of the third exposure beam correspondingly to a desired exposure pattern. The third exposure beam having thus been modulated in intensity by the AOM 34 is shaped by a collimator lens 35 to be a parallel light and transmitted through a $\lambda/2$-wave plate 36, and thus its direction of polarization is turned 90 deg. Then, the third exposure beam will go out of the third modulating optical system 23.

The AOM 34 is provided with a driver 37 to drive the AOM 34. For exposure of the photoresist 12 to the laser beam, a signal S3 corresponding to a desired exposure pattern, that is, a constant-level signal corresponding to a pattern of straight grooves Gs to be formed in the writable area W, is supplied to the driver 37 which will drive the AOM 34 according to the signal S3. Thus the AOM 34 will modulate the intensity of the third exposure beam.

As in the above, the first exposure beam is modulated in intensity by the first modulating optical system 21 correspondingly to the pattern of pits P to be formed in the read-only area R, the second exposure beam is modulated in intensity by the second modulating optical system 22 correspondingly to the pattern of wobbling grooves Gw to be formed in the writable area W, and the third exposure beam is modulated in intensity by the third modulating optical system 23 correspondingly to the pattern of straight grooves Gs to be formed in the writable area W.

The first exposure beam going out of the first modulating optical system 21 and the second exposure beam going out of the second modulating optical system 22 remain S-polarized, while the third exposure beam going out of the third modulating optical system 23 is P-polarized since it is transmitted through the $\lambda/2$-wave plate 36 and thus its direction of polarization is turned 90 deg.

The first exposure beam going out of the first modulating optical system 21 is reflected by a mirror 40, and guided horizontally and in parallel onto the moving optical table. Also, the second exposure beam going out of the second modulating optical system 22 is reflected by a mirror 41 and guided horizontally and in parallel onto the moving optical table. Similarly, the third exposure beam going out of the third modulating optical system 23 is reflected by a mirror 42 and guided horizontally and in parallel onto the moving optical table.

The first exposure beam going out of the first modulating optical system 21 and guided horizontally and in parallel onto the moving optical table, is reflected by a mirror 43 in a direction at a right angle to the optical path it has followed, and incident upon a polarizing beam splitter 45 through a half mirror 44. The second exposure beam going out of the second modulating optical system 22 and guided horizontally and in parallel onto the moving optical table, is optically deflected by a deflecting optical system 46, then reflected by the half mirror 44 in a direction at a right angle to the optical path it has followed, and incident upon a polarizing beam splitter 45. The third exposure beam going out of the third modulating optical system 23 and guided horizontally and in parallel onto the moving optical table is incident directly upon the polarizing beam splitter 45.

The deflecting optical system 46 is provided to optically deflect the second exposure beam correspondingly to the wobbling of the wobbling grooves Gw formed in the writable area W. That is, the second exposure beam going out of the second modulating optical system 22 and incident upon the deflecting optical system 46 is incident upon an acousto-optical deflector (AOD) 48 through a wedge prism 47. The AOD 48 optically deflects the beam by an acousto-optical element formed from tellurium oxide (TeO$_2$) or the like. Namely, the second exposure beam is optically deflected by the AOD 48 correspondingly to the wobbling of the wobbling grooves Gw. The second exposure beam thus optically deflected by the AOD 48 goes out of the deflecting optical system 46 through a wedge prism 49.

The wedge prisms 47 and 49 are provided to allow the second exposure beam to be incident upon the lattice plane of the acousto-optical element of the AOD 48 so as to satisfy the Bragg's equation and also keep unchanged the horizontal height of the second exposure beam even after optically deflected by the AOD 48. In other words, the wedge prism 47, AOD 48 and wedge prism 49 are disposed so that the lattice plane of the acousto-optical of the AOD 48 will satisfy the Bragg's equation and the horizontal height of the second exposure beam going out of the deflecting optical system 46 will not change.

The AOD 48 is provided with a driver 50 to drive the AOD 48. The driver 50 is supplied with a high frequency signal supplied from a voltage-controller oscillator (VCO) 51 and frequency-modulated with a control signal S4 including information signal. For exposure of the photoresist 12 to the laser light, a signal corresponding to a desired exposure pattern is supplied from the VCO 51 to the driver 50. The AOD 48 is driven by the driver 50 according to the signal S4, thus the second exposure beam is optically deflected.

The second exposure beam optically deflected by the deflecting optical system 46 is reflected by the half mirror 44 in the direction at a right angle to the optical path it has followed as mentioned above, and then incident upon the polarizing beam splitter 45.

The polarizing beam splitter 45 is adapted to reflect the S-polarized beam and transmit the P-polarized light. The first exposure beam going out of the first modulating optical system 21 and second exposure beam going out of the second modulating optical system 22 and optically deflected by the deflecting optical system 46 are an S-polarized light, and the third exposure beam going out of the third modulating optical system 23 is a P-polarized light. Therefore, the first and second exposure beams are reflected by the polarizing beam splitter 45 while the third exposure beam is transmitted through the polarizing beam splitter 45. Thus, the first exposure beam going out of the first modulating optical system 21, second exposure beam going out of the second modulating optical system 22 and optically deflected by the deflecting optical system 46 and the third exposure beam going out of the third modulating optical system 23 are recombined together to travel in the same direction.

The first to third exposure beams recombined together to travel in the same direction and going out of the polarizing beam splitter 45 are passed through a magnifier lens 52 to have a predetermined diameter, and reflected by a mirror 53 toward an objective lens 54. The objective lens 54 converges the beams onto the photoresist 12. Thus, the photoresist 12 is exposed to have latent images formed therein.

At this time, the glass substrate 11 coated with the photoresist 12 is rotated by the rotation driver in the direction of arrow C1 in FIG. 5 and translated by the moving optical table so that the surface of the photoresist 12 will wholly be exposed to the exposure beams in a desired pattern. As a result, latent images corresponding to the irradiated locus of the first to third exposure beams are formed on the whole surface of the photoresist 12.

All the exposure beams are not unit for exposure of the photoresist 12 to the laser light. For example, to form the latent image for the pits P which are to be formed in only the read-only area R, only the first exposure beam is used. For forming the latent images for the grooves Gw and Gs which are to be formed in the writable area W, only the second and third exposure beams are used. Namely, when the first exposure beam is not required, it is intercepted by the AOM 26 provided in the first modulating optical system 21. Similarly, when the second exposure beam is not necessary, it is intercepted by the AOM 30 provided in the second modulating optical system 22. Also, when the third exposure beam is unnecessary, it is intercepted by the AOM 34 provided in the third modulating optical system 23.

As in the above, the laser cutting apparatus 10 includes an optical system for the first exposure beam used to form a latent image corresponding to the pits P to be formed in the read-only area R, an optical system for the second exposure beam used to form a latent image corresponding to the wobbling grooves Gw to be formed in the writable area W, and an optical system for the third exposure beam used to form a latent image corresponding to the straight grooves Gs to be formed in the writable area W. Therefore, only with this laser cutting apparatus 10, the latent image for the pits P, latent image for the wobbling grooves Gw and latent image for the straight grooves Gs can be formed together.

In the laser cutting apparatus 10, when these exposure beams are converged by the objective lens 54 onto the photoresist 12, the relative positions of light spots defined by the first to third exposure beams can be adjusted by adjusting the directions of the mirror 43, half mirror 44 and polarizing beam splitter 45.

For example, to simultaneously form the latent image for the wobbling grooves Gw with the second exposure beam and latent image for the straight grooves Gs with the third exposure beam, the positions of the light spot defined by the second exposure beam and light spot defined by the third exposure beam can be adjusted in relation to each other by adjusting the directions of the mirror 43, half mirror 44 and polarizing beam splitter 45, thereby permitting to provide a desired interval between the wobbling grooves Gw and straight grooves Gs (namely, track pitch Tp1) with a high precision.

Also in this laser cutting apparatus 10, the width of the pits P to be formed in the read-only area R of the magneto-optical disc 1 can be adjusted by changing the focal length of the collimator lens 27 included in the first modulating optical system 21. That is, by changing the focal length of the collimator lens 27 to decrease the diameter of the first exposure beam, the width of the pits P can be decreased. On the other hand, by increasing the diameter of the first exposure beam, the width of the pits P can be increased.

Also, by changing the focal length of the collimator lens 31 included in the second modulating optical system 22, it is possible to adjust the width of the wobbling grooves Gw to be formed in the writable area W of the magneto-optical disc 1. That is to say, That is, by changing the focal length of the collimator lens 31 to decrease the diameter of the second exposure beam, the width of the wobbling grooves Gw can be decreased. On the other hand, by increasing the diameter of the second exposure beam, the width of the wobbling grooves Gw can be increased.

Also, by changing the focal length of the collimator lens 35 included in the third modulating optical system 23, it is possible to adjust the width of the straight grooves Gs to be formed in the writable area W of the magneto-optical disc 1. That is to say, That is, by changing the focal length of the collimator lens 35 to decrease the diameter of the third exposure beam, the width of the straight grooves Gs can be decreased. On the other hand, by increasing the diameter of the third exposure beam, the width of the straight grooves Gs can be increased.

Note that the width of the pits P, wobbling grooves Gw and straight grooves Gs can be adjusted also by changing in power the respective exposure beams. That is, by increasing the power of the first exposure beam, the width of the pits P can be increased. With the power of the first exposure beam, it is possible to decrease the width of the pits P. By increasing the power of the second exposure beam, the width of the wobbling grooves Gw can be increased. By decreasing the power of the second exposure beam it is possible to decrease the width of the wobbling grooves Gw. Also, by increasing the power of the third exposure beam, it is possible to increase the width of the straight grooves Gs while by decreasing the power of the third exposure beam, the width of the straight grooves Gs can be decreased.

In the laser cutting apparatus 10, the objective lens 54 provided to converge the exposure beam on the photoresist 12 should preferably have a larger numeral aperture NA to form latent images for finer pits P and grooves Gw and Gs. More particularly, the numerical aperture NA should preferably be 0.9 or so. In this laser cutting apparatus 10, when irradiating the exposure beam to the photoresist 12, the diameter of the exposure beam is changed by the magnifier lens 52 and the effective numerical aperture of the objective lens 54 is adjusted, as necessary. Thus, the spot diameter of the exposure beam converged on the surface of the photoresist 12 can be adjusted.

3. Optical Head

Figure 6:
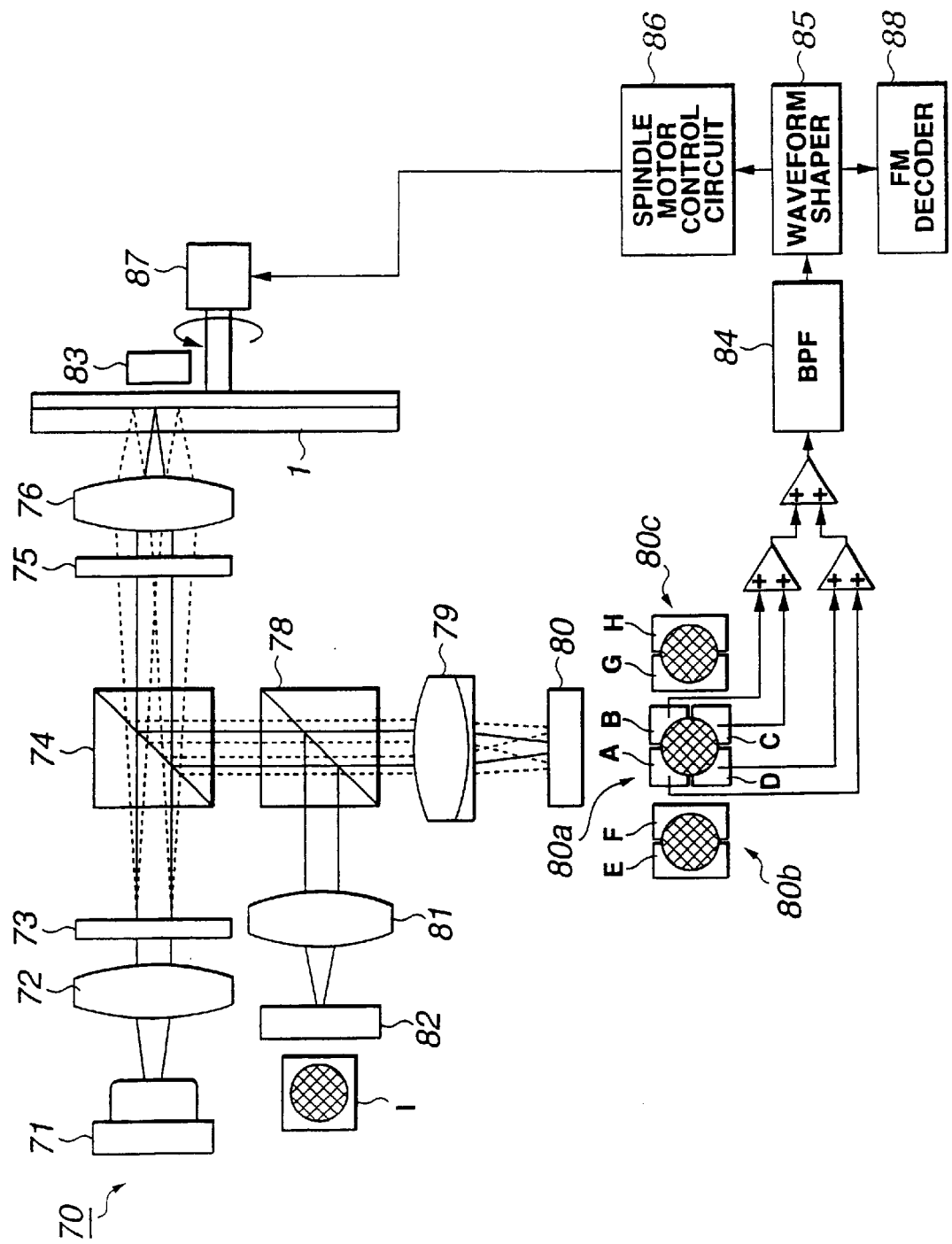
FIG. 6 shows the optical head and its peripheral circuits used to write and read data to and from the magneto-optical disc according to the present invention.

Referring now to FIG. 6, there is schematically illustrated an typical example of the optical head used to write and read data to and from the aforementioned magneto-optical disc 1. The optical head and how to detect various signals necessary for data write and read to and from the optical head will be described below with reference to FIG. 6.

The optical head is generally indicated with a reference 70. In this optical head 70, a linear-polarized laser light is emitted from a semiconductor laser 71. It is shaped by a collimator lens 72 into a parallel light and incident upon a grating 73 which separates the laser light into three beams, 0-order and ±1-order. The 0-order laser beam from the grating 73 will be referred to as "main beam" while the 1-order laser beams will be referred to as "sub beams", hereinafter.

The main and sub beams are transmitted through a polarizing beam splitter 74, and incident upon a quarter-wave plate 75. After passing through the quarter-wave plate 75, the beams are circularly polarized. Thereafter, the circularly polarized beams are converged onto the magneto-optical disc 1 through an objective lens 76 to form three light spots on the magneto-optical disc 1.

The spot of the main beam (central one) of these light spots is used primarily to write or read information signal to or from the magneto-optical disc 1, and the spots of the sub beams are used mainly to detect a tracking error.

A return light reflected from the magneto-optical disc 1 is incident upon the quarter-wave plate 75 again through the objective lens 76. The return light having been transmitted through the quarter-wave plate 75 is a linearly polarized one. Thereafter, the return light is incident upon and reflected by the polarizing beam splitter 74, and thus it is taken out.

The return light reflected by and taken out from the polarizing beam splitter 74 is incident upon a polarizing beam splitter 78 which will split it into as an S-polarized component and P-polarized component.

One of the polarized components from the polarizing beam splitter 78 is incident upon a combination lens 79. The return light incident upon the combination lens 79 is converged by the latter, incident upon a photodetector 80 through a lens which will astigmatize the return light, and then detected by the photodetector 80.

The photodetector 80 consists of a first photosensor 80a to detect the return light of the main beam, a second photosensor 80b to detect the return light of one of the sub beams, and a third photosensor 80c to detector the return light of the other sub beam. Further, the first photosensor 80a consists of four detectors A, B, C and D. The second photosensor 80b consists of two detectors E and F, and the third photosensor 80c consists of two detectors G and H. That is, the photodetector 80 has eight detectors A to H. The detectors A to D detect the return light of the main beam, detectors E and F detect the return light of one of the sub beams, and detectors G and H detect the return light of the other sub beam.

The other polarized component from the polarizing beam splitter 78 is incident upon a lens 81 which will converge the light. The return light converged by the lens 81 is incident upon a photodetector 82 which detects the return light. The photodetector 82 has one detector I to detect the return light of the main beam.

It should be noted that an optical recording and/or reproducing apparatus incorporating the optical head 70 is also provided with a magnetic head 83 for magneto-optical recording of information signal, as shown in FIG. 6. The magnetic head 83 is disposed to face the magneto-optical disc 1 with the objective lens 76 provided at the opposite side of the disc 1 to the head 83. For data write, by the magneto-optical recording, to the magneto-optical disc 1, the magnetic head 83 will apply the magneto-optical disc 1 with a magnetic field corresponding to an information signal to be written to the disc 1.

In the aforementioned optical head 70, each of the detectors A to I of the photodetectors 80 and 82 provide an electric signal corresponding to the intensity of an incident light upon the detector. The optical head 70 will calculate the electric signal from each of the detectors A to I in a predetermined manner to detect a signal read from the magneto-optical disc 1, a focus error signal for adjusting the focused position of the light spot, and a tracking error signal for moving the light spot to track a recording track.

The detectors A to I provide output signals A to I. A signal obtained by reading information signal written in the writable area W of the magneto-optical disc 1 by the magneto-optical recording method (will be referred to as "magneto-optical read signal" hereinafter), is given by the following expression (1):

$$\text{Magneto-optical read signal} = (A+B+C+D)-I \quad (1)$$

A signal obtained by reading information signal written with the pits P formed in the read-only area R of the magneto-optical disc 1, is given by the following expression (2) or (3):

$$\text{Pit read signal} = A+B+C+D \quad (2)$$

$$\text{Pit read signal} = I \quad (3)$$

In this optical head 70, the focus servo control for adjustment of the focused position of the light spot is effected by the astigmatic method. Thus, the focus error signal is given by the following expression (4):

$$\text{Focus error signal} = (A+C)-(B+D) \quad (4)$$

Figure 7:
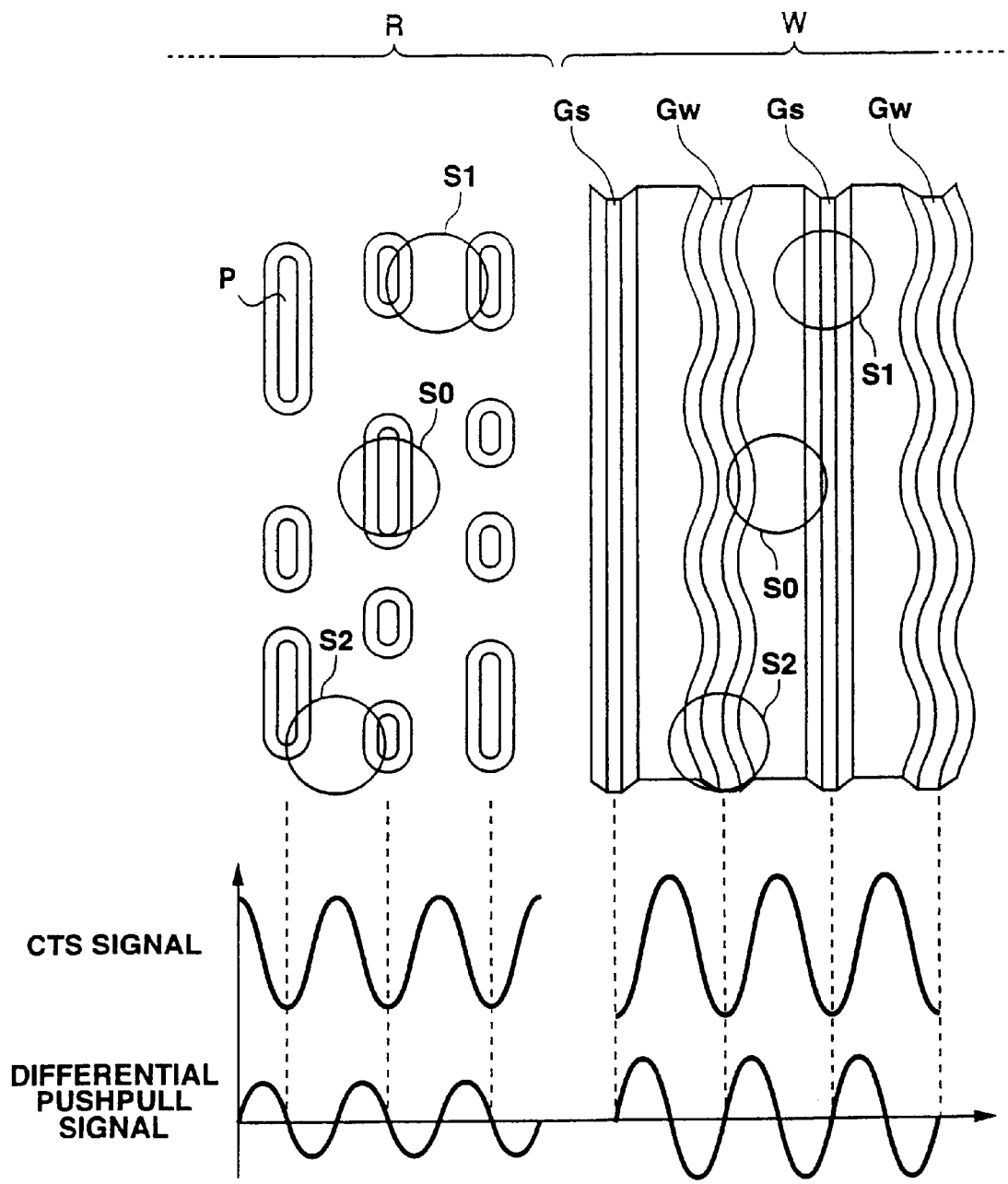
FIG. 7 explains the tracking servo based on the differential push-pull method and shows the light spots of main and sub beams irradiated onto the information recording area of the magneto-optical disc and the relation between the light spots and the push-pull and cross-track signals.

Also in this optical head 70, the tracking servo control under which the light spot is allowed to track the recording track by the differential push-pull (DPP) method. When the DPP method of tracking servo control is effected, the angle, etc. of the grating 73 are adjusted to align the main beams S0 and sub beams S1 and S2 with each other as shown in FIG. 7 so that the sub beams S1 and S2 are incident upon positions, respectively, a half of the track pitch from the main beam S0. The return light of one of the sub beams (S1) is detected by the detectors E and F of the photodetector 80, while that of the other sub beam S2 is detected by the detectors G and H of the photodetector 80.

FIG. 7 shows the read-only area R to which the main and sub beams S0, S1 and S2 are irradiated and the writable area W to which the main and sub beams S0, S1 and S2 are irradiated.

In the DPP method, a differential push-pull signal is detected based on a difference signal ((A+D)−(B+C)) of the return light of the main beam, difference signal (E−F) of the return light of one of the sub beams, and a difference signal (G−H) of the return light of the other sub beam. The detected differential push-pull signal is used as a tracking error signal.

The differential push-pull signal is given by the following expression (5). It varies as shown in FIG. 7 depending upon the position of a spot defined by the main beam irradiated on the magneto-optical disc 1. In the optical head 70, the differential push-pull signal given by the expression (5) is used as a tracking error signal to allow the light spot to track the recording track.

$$\text{Differential push-pull signal} = \{(A+D)-(B+C)\} - \alpha\{(E-F)+(G-H)\} \quad (5)$$

where α is a predetermined constant.

In the optical head 70, when track seek is done to move the light spot to a selected recording track, a cross-track signal is used to count the recording tracks across which the light spot has been moved.

The cross-track signal is given by the following expression (6). It varies as shown in FIG. 7 depending upon the position of a spot defined by the main beam irradiated on the magneto-optical disc 1. During seek track in the optical head 70, the recording tracks across which the light spot has been moved are counted using the cross-track signal given by the expression (6) and the light spot is moved to a desired recording track.

$$\text{Cross-track signal} = (A+B+C+D) \quad (6)$$

In the magneto-optical disc 1, the wobbling grooves Gw are formed in the writable area W and frequency-modulated wobbling address information is added to each of the wobbling grooves Gw itself In the optical head 70, the wobbling address information is detected based on a sum signal (A+B+C+D) from the first photosensor 80a of the photodetector 80.

Namely, to read the wobbling address information, the sum signal (A+B+C+D) from the first photosensor 80a of the photodetector 80 is supplied to a bandpass filter (BPF) 84, and an output signal from the BPF 84 is supplied to a waveform shaper 85, as shown in FIG. 6. The waveform shaper 85 generates a clock signal based on the output signal supplied from the BPF 84 and supplies it to a spindle motor control circuit 86. Supplied with the clock signal, the spindle motor control circuit 86 controls a spindle motor 87 based on the clock signal to drive to rotate the magneto-optical disc 1 at a constant linear velocity. The output signal from the waveform shaper 85 is supplied to an FM decoder 88. It is decoded by the FM decoder 88 to read the wobbling address information. Information signal is written by the optical head 70 to the writable area W while the address is being confirmed based on the read wobbling address information.

4. Evaluation of the Magneto-optical Disc

To evaluate the characteristics of the aforementioned optical recording medium according to the present invention, a plurality of evaluation magneto-optical discs in depth and width of the pits P, wobbling grooves Gw and straight grooves Gs different from one another as well as in amplitude of the wobbling of the wobbling grooves Gw was made, data was written to and read from them using the aforementioned optical head 70, and their characteristics were thus determined. The results of the evaluation will be described herebelow.

5-1 Making of Evaluation Magneto-optical Discs

First, the previously described stamper was prepared using the laser cutting apparatus 10, and then the stamper was used to form the disc substrate 2 from polycarbonate (having a refractive index n of 1.58). There were formed on the disc substrate 2 the first dielectric layer 3 of $Si_3N_4$, photo-magnetic layer 4 of TbFeCo, second dielectric layer 5 of $Si_3N_4$, and the light-reflective layer 6 of Al. After that, the protective layer 7 of ultraviolet-setting resin was formed on the light-reflective layer 6.

In the evaluation magneto-optical disc thus manufactured, the read-only area R had written therein 1–7 modulated information signal as a train of the pits P while the writable area W had formed therein wobbling grooves Gw and straight grooves Gs double-spirally along the recording tracks.

To form latent images for the pits P, wobbling grooves Gw and straight grooves Gs in the photoresist 12 by the laser cutting apparatus 10, a Kr laser which can emit a laser light of 413 nm in wavelength λ was used as the light source 13. In the first modulating optical system 21, the condenser lens 25 had a focal length of 80 mm and the collimator lens 27 had a focal length of 90 mm. In the second and third modulating optical systems 22 and 23, the condenser lenses 29 and 33 had a focal length of 80 mm and the collimator lenses 31 and 35 had a focal length of 120 mm. The magnifier lens 52 had a focal length of 80 mm and the objective lens 54 had a numerical aperture NA of 0.9.

When exposing the photoresist 12 to the first exposure beam to form the latent images for the pits P, the glass substrate 11 was rotated while being translated by the moving optical table. At this time, the linear velocity was 2.0 m/sec and feed pitch was 0.95 μm. It should be noted that the feed pitch corresponds to the track pitch Tp2 in the read-only area R. Namely, in the read-only area R, the pit train was formed single-spirally at the track pitch Tp2 of 0.95 μm.

When exposing the photoresist 12 to the second and third exposure beams to form the latent images for the wobbling grooves Gw and straight grooves Gs, the glass substrate 11 was rotated while being translated by the moving optical table. At this time, the linear velocity was 2.0 m/sec and the feed pitch was 1.90 μm. Note that the feed pitch corresponds to the track period Tpr in the writable area W. That is, in the writable area W, the wobbling grooves Gw and straight grooves Gs were formed double-spirally at the track period Tpr of 1.90 μm and track pitch Tp1 of 0.95 μm.

It should be noted that when forming the latent images for the wobbling grooves Gw by the second exposure beam and those for the straight grooves Gs by the third exposure beam, the directions of the mirror 43, half mirror 44 and polarizing beam splitter 45 were adjusted for the interval between the light spot of the second exposure beam and that of the third exposure beam to correspond to the track pitch Tp1, so that the wobbling grooves Gw and straight grooves Gs would be formed double-spirally.

For forming the latent images for the wobbling grooves Gw in the photoresist 12, the second exposure beam was optically deflected by the deflecting optical system 46. More specifically, a high frequency signal having a center frequency of 224 MHz is modulated with a control signal including information signal having a frequency of 84.672 kHz and this FM signal is supplied to the driver 50 from the VCO 51 of the modulating optical system 46. Based on the FM signal, the driver 50 drives the AOD 48 to change the Bragg angle of the acousto-optical element of the AOD 48, thereby optically deflecting the second exposure beam.

The wobbling amplitude of the wobbling grooves Gw can be changed by changing the amplitude of the optical deflection by the AOD 48 when optically deflecting the second exposure beam by the deflecting optical system 46. Thus, when making the plurality of evaluation magneto-optical discs different in wobbling amplitude of the wobbling grooves Gw from one another, the amplitude of the optical deflection by the AOD 48 was changed when optically deflecting the second exposure beam by the deflecting optical system 46. More specifically, evaluation magneto-optical discs were made which were ±16, ±20 and ±24 nm, respectively, in amplitude A of the wobbling areas Gw.

Also, in making the evaluation magneto-optical discs different in depth of the pits P, wobbling grooves Gw and straight grooves Gs from one another, the thickness of the photoresist 12 was changed for each of the discs when forming in the photoresist 12 the latent images for the pits P, wobbling grooves Gw and straight grooves Gs by the laser cutting apparatus 10. The thickness of the photoresist 12 applied to the glass substrate 11 corresponds to the depth of the pits P, wobbling grooves Gw and straight grooves Gs to be formed in the magneto-optical disc finally produced. Thus, a plurality of stampers for the plurality of evaluation magneto-optical discs under consideration was prepared with the thickness of the photoresist 12 applied to the glass substrate 11 changed for each of the stampers, and they were used to make the evaluation magneto-optical discs different in depth of the pits P, wobbling grooves Gw and straight grooves Gs from one another. More specifically, the evaluation magneto-optical discs were made which were 56, 63 and 70 nm, respectively, in depth of the pits P, wobbling grooves Gw and straight grooves Gs.

Also, in making the evaluation magneto-optical discs different in width of the grooves Gw and Gs from one another, the power of the second and third exposure beams was changed for each of the discs when forming in the photoresist 12 the latent images for the grooves Gw and Gs by the laser cutting apparatus 10. That is, when forming in the photoresist 12 the latent images for the grooves Gw and Gs, the power of the second and third exposure beams was changed about 0.5 mW for each of the discs.

More specifically, when making the evaluation magneto-optical discs, the above power of 0.5 mW was taken as 100% and the power of the second and third exposure beams was changed in a range of 80 to 140%. At this time, the relation between the power of the second and third exposure beams and the width of the grooves Gw and Gs formed in the writable area W was examined. The result is shown in Table 1. Note that the width of the grooves Gw and Gs was measured by preparing a disc substrate 2 having replicated thereon pit and land patterns formed in the stamper and measuring the width of the grooves Gw and Gs formed in the disc substrate 2 by an atomic force microscope (AFM).

TABLE 1

Writable area

| Exposure beam power | Groove width |
|---|---|
| 80% | 175 nm |
| 90% | 197 nm |
| 100% | 218 nm |
| 100% | 238 nm |
| 120% | 257 nm |
| 130% | 276 nm |
| 140% | 295 nm |

As shown in Table 1, the power of the second and third exposure beams was changed to make evaluation magneto-optical discs which were 175, 197, 218, 238, 257, 276 and 295 nm, respectively, in width of the grooves Gw and Gs.

Also, in making the evaluation magneto-optical discs different in width of the pits P from one another, the power of the first exposure beams was changed for each of the discs when forming in the photoresist 12 the latent image for the pits P by the laser cutting apparatus 10. That is, when forming in the photoresist 12 the latent image for the pits P, the power of the first exposure beam was changed about 0.5 mW for each of the discs.

More specifically, when making the evaluation magneto-optical discs, the above power of 0.5 mW was taken as 100% and the power of the first exposure beam was changed in a range of 80 to 130%. At this time, the relation between the power of the first exposure beam and the width of the pits P formed in the read-only area R was examined. The result is shown in Table 2. Note that the width of the pits P was measured by preparing a disc substrate 2 having replicated thereon pit and land patterns formed in the stamper and measuring the width of the pits P formed in the disc substrate 2 by an atomic force microscope (AFM).

TABLE 2

Read-only area

| Exposure beam power | Pit width |
|---|---|
| 80% | 339 nm |
| 90% | 356 nm |
| 100% | 373 nm |
| 110% | 390 nm |
| 120% | 406 nm |
| 130% | 421 nm |

As shown in Table 2, the power of the first exposure beam was changed to make evaluation magneto-optical discs which were 339, 356, 373, 390, 406 and 421 nm, respectively, in width of the pits P.

5-2 Evaluating Conditions

The characteristics of the evaluation magneto-optical discs made as in the above were evaluated using an MD Data2 evaluating apparatus. This MD Data2 evaluating apparatus uses the optical head 70 and magnetic head 83 constructed as shown in FIG. 6 to actually write and read data to and from the disc. Thus, the characteristics of the discs were measured.

The laser light used for data write and read had a wavelength $\lambda$ of 660 $\mu$m, and the objective lens to converge the laser light had a numerical aperture NA of 0.52. For reading, by the MD Data2 evaluating apparatus, information signal recorded as a train of pits P in the read-only area R and information signal recorded by the magneto-optical recording method in the writable area W, the linear velocity was 2.0 m/sec and the power of the reading laser light was 1.0 mW. Also for writing information signal to the writable area W by the MD Data2 evaluating apparatus using the magneto-optical recording method, the linear velocity was 2.0 m/sec and the power of the writing laser light was 8.0 mW. The information signal was written to the writable area W by the field modulating method using a pulse train having a duty cycle of 50% as the writing laser pulse.

The evaluation magneto-optical discs were evaluated according to the standard having been proposed concerning the MD Data2 format. In the MD Data2 format, the characteristics including I2/Itop, I8/Itop, asymmetry, RC, push-pull signal amount, C/N with which wobbling address information is read, and jitter are prescribed as shown in Table 3.

TABLE 3

| | Read-only area (with pits) | Writable area (with grooves) |
|---|---|---|
| I2/Itop | 0.12 to 0.24 | — |
| I8/Itop | 0.50 or more | — |
| Asymmetry | +0.05 to −0.15 | — |
| RC | +0.14 to −0.24 | 0.30 to 0.50 |
| Push-pull signal amount | 0.018 to 0.036 | 0.040 to 0.080 |
| C/N with which wobbling address signal is read | — | 3.3 dB or more (BW = 3 kHz) |
| Jitter | 8.4% or less | 8.4% or less |

In Table 3, the I2 is a modulated degree of pits having a mark length of 2T, the I8 is a modulated degree of pits having a mark length of 8T, the Itop is a maximum value of the modulated degree of pits. Therefore, the I2/Itop is a value obtained by normalizing the modulated degree of pits of a pit read signal for reading information signal from the pits each having the mark length of 2T by the maximum modulated degree of the pits, and the I8/Itop is a value obtained by normalizing the modulated degree of pits of a pit read signal for reading information signal from the pits each having the mark length of 8T by the maximum modulated degree of the pits.

The RC stands for Radial Constant indicating the magnitude of the amplitude of a cross-track signal. The RC can be given by the following expression (7):

$$RC=(C_1-C_2)/\{(C_1+C_2)/2\} \quad (7)$$

where $C_1$ is a peak value of the cross-track signal when the light spot of the main beam exists on the groove (namely, when the light spot of the main beam exists between neighbouring recording tracks) and $C_2$ is a peak value of the cross-track signal when the light spot of the main beam exists on a land (namely, when the light spot of the main beam exists on a recording track).

To assure a stable data read and write, the magneto-optical disc 1 should also desirably meet the requirements shown in Table 3.

That is, for the track servo control and track seek to stably be done in the writable and read-only areas W and R, the push-pull signal amount and RC value should desirably be within their respective ranges shown in Table 3.

For stable data write or read to or from the writable area W, the jitter of a magneto-optical read signal obtained by reading information signal written by the magneto-optical recording has to be sufficiently small and should also desirably be within its range shown in Table 3.

For stable reading of information signal written as a train of the pits P in the read-only area R, it is necessary that the modulated degree of the pits should be sufficient, the asymmetry should be within an appropriate range, and that the I2/Itop, I8/Itop and asymmetry values should be within their respective ranges shown in Table 3. Also, to stably read information signal written as a train of the pits P in the read-only area R, the jitter of a read signal from the pits P has to be sufficiently small and should also desirably be within its range shown in Table 3.

For stable reading of wobbling address information from the writable area W, the C/N with which wobbling address information is read should be sufficiently large and should also desirably be within the range shown in Table 3.

The above-mentioned characteristics of the evaluation magneto-optical discs were measured and evaluated. Note that the jitter was measured using the time interval analyser TA320 by the Yokogawa Electric. The window width was 113.4 nsec, and the value σ was normalized by the window width. The C/N with which wobbling address information is read was determined by reading the wobbling address information using a bandpass filter whose pass band is 3 kHz and measuring the C/N value at this time.

5-3 Results of Evaluation

RC in the writable area, push-pull signal amount and jitter of magneto-optical read signal were measured of the evaluation magneto-optical discs different in width and width of grooves Gw and Gs from one another. The results are shown in Table 4.

TABLE 4

| Writable area | | | | |
|---|---|---|---|---|
| Groove depth (nm) | Groove width (nm) | RC | Push-pull signal amount | Jitter (%) |
| 56 | 175 | 0.401 | 0.0435 | 7.55 |
| | 197 | 0.398 | 0.0486 | 7.53 |
| | 218 | 0.395 | 0.0583 | 7.58 |

TABLE 4-continued

| Writable area | | | | |
|---|---|---|---|---|
| Groove depth (nm) | Groove width (nm) | RC | Push-pull signal amount | Jitter (%) |
| | 238 | 0.389 | 0.0645 | 7.76 |
| | 257 | 0.340 | 0.0694 | 7.88 |
| | 276 | 0.322 | 0.0751 | 8.02 |
| | 295 | 0.302 | 0.0799 | 8.25 |
| 63 | 175 | 0.429 | 0.0432 | 7.55 |
| | 197 | 0.424 | 0.0482 | 7.55 |
| | 218 | 0.422 | 0.0580 | 7.55 |
| | 238 | 0.416 | 0.0640 | 7.73 |
| | 257 | 0.367 | 0.0690 | 7.90 |
| | 276 | 0.348 | 0.0748 | 8.05 |
| | 295 | 0.327 | 0.0796 | 8.31 |
| 70 | 175 | 0.499 | 0.0401 | 7.58 |
| | 197 | 0.498 | 0.0461 | 7.60 |
| | 218 | 0.496 | 0.0540 | 7.65 |
| | 238 | 0.470 | 0.0630 | 7.75 |
| | 257 | 0.466 | 0.0670 | 7.92 |
| | 276 | 0.455 | 0.0700 | 8.07 |
| | 295 | 0.443 | 0.0730 | 8.29 | as seen from Table 4, when the grooves Gw and Gs are formed 56 to 70 nm deep and 175 to 295 nm wide in the writable area W, the requirements for the RC, push-pull signal amount and jitter of magneto-optically read signal, prescribed in the standard shown in Table 3 will be met. Therefore, by forming the grooves Gw and GS of 56 to 70 nm in depth and 175 to 295 nm in width in the writable area W, it is possible to stable effect tracking servo control and track seek and stably write and read information signal magneto-optically.

Also the I2/Itop, I8/Itop, asymmetry, RC, push-pull signal and jitter of read signal from pits in the read-only area R were measured of the evaluation magneto-optical discs different in width and depth of the pits P from one another. The results are shown in Table 5.

TABLE 5

| Read-only area | | | | | | | |
|---|---|---|---|---|---|---|---|
| Pit depth (nm) | Pit width (nm) | I2/Itop | I8/Itop | Asymmetry | RC | Push-pull signal amount | Jitter (%) |
| 56 | 339 | 0.121 | 0.512 | 0.040 | 0.133 | 0.0198 | 7.14 |
| | 356 | 0.125 | 0.527 | −0.022 | 0.140 | 0.0206 | 6.55 |
| | 373 | 0.127 | 0.538 | −0.064 | 0.144 | 0.0220 | 6.49 |
| | 390 | 0.132 | 0.541 | −0.091 | 0.148 | 0.0232 | 6.82 |
| | 406 | 0.134 | 0.547 | −0.125 | 0.152 | 0.0252 | 7.10 |
| | 421 | 0.135 | 0.551 | −0.150 | 0.155 | 0.0262 | 7.35 |
| 63 | 339 | 0.130 | 0.605 | 0.045 | 0.141 | 0.0191 | 7.02 |
| | 356 | 0.132 | 0.620 | −0.019 | 0.146 | 0.0203 | 6.46 |
| | 373 | 0.133 | 0.648 | −0.060 | 0.153 | 0.0217 | 6.44 |
| | 390 | 0.141 | 0.664 | −0.088 | 0.171 | 0.0231 | 6.73 |
| | 406 | 0.148 | 0.672 | −0.122 | 0.171 | 0.0251 | 7.05 |
| | 421 | 0.148 | 0.675 | −0.148 | 0.170 | 0.0260 | 7.35 |
| 70 | 339 | 0.164 | 0.700 | 0.043 | 0.161 | 0.0180 | 7.00 |
| | 356 | 0.169 | 0.715 | −0.021 | 0.167 | 0.0189 | 6.40 |
| | 373 | 0.167 | 0.735 | −0.063 | 0.174 | 0.0198 | 6.38 |
| | 390 | 0.162 | 0.748 | −0.090 | 0.179 | 0.0207 | 6.70 |
| | 406 | 0.162 | 0.750 | −0.125 | 0.183 | 0.0220 | 7.02 |
| | 421 | 0.158 | 0.751 | −0.150 | 0.186 | 0.0229 | 7.30 |

As seen from Table 5, when the pits P are formed 56 to 70 nm deep and 339 to 421 nm wide in the read-only area R, the requirements for the I2/Itop, I8/Itop, asymmetry, RC, push-pull signal amount and jitter of read signal from the pits in the read-only area R, prescribed in the standard shown in Table 3 will be met. Therefore, by forming the grooves Gw and Gw of 56 to 70 nm in depth and the pits P of 339 to 421 nm in width in the read-only area R, it is possible to stably effect tracking servo control and track seek and stably read information signal written as a train of the pits P.

The C/N with which wobbling address information is read was measured of the evaluation magneto-optical discs different in amplitude of the wobbling grooves Gw and width of the grooves Gw and Gs from one another. The results are shown in Table 6. Note that the depth of the grooves Gw and Gs was fixed at 63 nm.

TABLE 6

| | Writable area | |
|---|---|---|
| Amplitude of wobbling grooves | Groove width | C/N with which wobbling address information is read |
| ±16 nm | 175 nm | 34.7 dB |
| | 197 nm | 35.6 dB |
| | 218 nm | 36.2 dB |
| | 238 nm | 36.8 dB |
| | 257 nm | 37.2 dB |
| | 276 nm | 37.5 dB |
| | 295 nm | 37.8 dB |
| ±20 nm | 175 nm | 36.7 dB |
| | 197 nm | 37.6 dB |
| | 218 nm | 38.2 dB |
| | 238 nm | 38.5 dB |
| | 257 nm | 38.9 dB |
| | 276 nm | 39.2 dB |
| | 295 nm | 39.5 dB |
| ±24 nm | 175 nm | 37.5 dB |
| | 197 nm | 38.5 dB |
| | 218 nm | 39.2 dB |
| | 238 nm | 39.6 dB |
| | 257 nm | 39.9 dB |
| | 276 nm | 40.2 dB |
| | 295 nm | 40.4 dB |

As seen from Table 6, when in the writable area W, the grooves Gw and Gs are formed 175 to 295 nm wide and the wobbling grooves Gw are wobbled to have a wobbling amplitude of ±16 to ±24 nm, the C/N with which wobbling address information is read meets the requirement in the standard shown in Table 3. Therefore, by forming the grooves Gw and Gs 175 to 295 mm wide and the wobbling grooves Gw having the wobbling amplitude of ±16 to ±24 nm, in the writable area W, it is possible to stably read the wobbling address information.

As will be apparent from the above, the grooves Gw and Gs formed in the writable area W and the pits P formed in the read-only area R should preferably be 56 to 70 nm deep. When these values are commonly expressed based on the wavelength λ of the laser light used for data write and read and refractive index n of the disc substrate 2, the depth of 56 nm will be λ/7.5 n and the depth of 70 nm will be λ/6.0 n since λ=660 nm and n=1.58 in the evaluation magneto-optical discs. Therefore, the depth of the grooves Gw and Gs formed in the writable area W and that of the pits P formed in the read-only area R should preferably be within a range of λ/7.5 to λ/6.0.

As mentioned above, the grooves Gw and Gs formed in the writable area W should preferably be 175 to 295 nm wide. When these values are commonly expressed with the track pitch Tp1 of 950 nm, 175 nm/920 nm will be 18.4% and 295 nm/950 nm will be 31.1%. Therefore, on the assumption that the width of the grooves Gw and Gs formed in the writable area W is taken as Wg and the track pitch Tp1 of the recording tracks in the writable area W is taken as Tp1, Wg/Tp1 should preferably be within a range of 18.4 to 31.1%.

Also, as described in the above, the pits P formed in the read-only area R should preferably be 339 to 421 nm. When these values are commonly expressed with the track pitch Tp2 of 950 nm, 339 nm/950 nm will be 35.7% and 421 nm/950 nm will be 44.3%. Therefore, on the assumption that the width of the pits P formed in the read-only area R is Wp and the track pitch of the recording tracks in the read-only area R is Tp2, Wp/Tp2 should preferably be within a range of 35.7 to 44.3%.

Also, as mentioned in the above, the wobbling amplitude of the wobbling grooves Gw formed in the writable area W should preferably be ±16 to ±24 nm. When these values are commonly expressed with the track pitch Tp1 of 950 nm, ±16 nm/950 nm will be ±1.68% and ±24 nm/950 nm will be ±2.53%. Therefore, on the assumption that the wobbling amplitude of the wobbling grooves Wg formed in the writable area W is A and the track pitch of the recording tracks in the writable area W is Tp1, A/Tp1 should preferably be within a range of ±1.68 to ±2.53%.

As will be evident from the above-mentioned results of evaluation, by selecting the depth of the grooves Gw and Gs and pits P which is within a range of λ/7.5 n to λ/6.0 n, the groove width commonly expressed with the track pitch, namely, Wg/Tp1, that is within a range of 18.4 to 31.1% based on the value of Wg/Tp1, the pit width commonly expressed with the track pitch, namely, Wp/Tp2, that is within a range of 35.7 to 44.3%, and the wobbling amplitude of the wobbling grooves Gw, commonly expressed with the track pitch, namely, A/Tp1, that is within a range of ±1.68 to ±2.53%, respectively, it is possible even when the track pitch is as narrow as 950 nm to effect tracking servo control and track seek in the writable and read-only areas W and R, write and read information signal to and from the writable area W, read information signal written in the read-only area R and to read wobbling address information in the read-only area R, all with a sufficient stability.

FIG. 8 summarizes the preferred variable ranges in the read and write portions of an optical recording medium and a stamper for use to manufacture an optical recording medium in accordance with the present invention.

As having been described in the foregoing, the present invention makes it possible to assure sufficient levels of various signals required for data write and read, even when the track pitch is decreased for a higher recording density as in the MD Data2. That is to say, the present invention can provide an optical recording medium in which the track pitch is narrowed and thus data can be recorded with a higher density.

What is claimed is:

1. An optical recording medium having a writable area in which grooves are formed along recording tracks and a read-only area in which pits are formed along the recording tracks, wherein:

where the refractive index of a medium provided extending from a light-incident surface to a surface in which the grooves and pits are formed is n and the wavelength of a light used for data write and read is λ, the grooves and pits each have a depth within a range of λ/7.5 n to λ/6.0 n;

where the width of each of the grooves formed in the writable area is Wg and the pitch between the recording tracks in the writable area is Tp1, Wg/Tp1 is within a range of 18.4 to 31.1%; and where the width of each of the pits formed in the read-only area is Wp and the pitch between the recording tracks in the read-only area is Tp2, Wp/Tp2 is within a range of 35.7 to 44.3%, and the writable area has two grooves formed double-spirally therein, at least one of the two grooves being at least partially wobbled, and where the amplitude of the wobbling groove is A, A/Tp1 is within a range of ±1.68 to ±2.53%.

2. A stamper for use to manufacture an optical recording medium having a writable area in which grooves are formed along recording tracks and a read-only area in which pits are formed along the recording tracks, comprising:

a stamper writable area in which stamper grooves are formed along stamper recording tracks and a stamper read-only area in which stamper pits are formed along the stamper recording tracks, wherein:

where the refractive index of the optical recording medium provided extending from a light-incident surface to a surface in which the grooves and pits are formed is n and the wavelength of a light used for data write and read the optical recording medium is $\lambda$, the stamper grooves, and stamper pits each have a depth within a range of $\lambda/7.5$ n to $\lambda/6.0$ n;

where the width of each of the stamper grooves formed in the stamper writable area is Wg and the pitch between the stamper recording tracks in the stamper writable area is Tp1, Wg/Tp1 is within a range of 18.4 to 31.1%;

on the assumption that the width of each of the stamper pits formed in the stamper read-only area is Wp and the stamper pitch between the stamper recording tracks in the read-only only area is Tp2, Wp/Tp2 is within a range of 35.7 to 44.3%; and the stamper writable area has two stamper grooves formed double-spirally therein, at least one of the two stamper grooves is at least partially wobbled, and where the amplitude of the wobbling stamper groove is A, A/Tp1 is within a range of ±1.68 to ±2.53%.

* * * * *

UNITED STATES PATENT AND TRADEMARK OFFICE
CERTIFICATE OF CORRECTION

PATENT NO.    : 6,487,164 B1                                              Page 1 of 1
DATED         : November 26, 2002
INVENTOR(S)   : Sohmei Endoh et al.

It is certified that error appears in the above-identified patent and that said Letters Patent is hereby corrected as shown below:

Column 14,
Line 55, after "itself" insert a period.

Column 17,
Table 1, line 12, change "100%" to -- 110% --.

Column 20,
Line 24, change "as" to -- As --.

Signed and Sealed this

Twelfth Day of August, 2003

JAMES E. ROGAN
*Director of the United States Patent and Trademark Office*